United States Patent [19]
Jackson et al.

[11] Patent Number: 5,771,161
[45] Date of Patent: Jun. 23, 1998

[54] UNINTERRUPTABLE CAPABILITY FOR AN ACTIVE POWER LINE CONDITIONER

[75] Inventors: Kenneth R. Jackson, Columbia; Stephen A. Lane, Cockeysville, both of Md.

[73] Assignee: Northrop Grumman Corporation, Los Angeles, Calif.

[21] Appl. No.: 782,477

[22] Filed: Jan. 10, 1997

[51] Int. Cl.[6] .............................. H02M 1/12; H02M 1/14
[52] U.S. Cl. .............................. 363/40; 323/207; 307/64; 363/71; 363/98
[58] Field of Search .................................. 363/40, 39, 41, 363/35, 37, 132, 71, 98; 323/207, 344; 307/64, 68

[56] References Cited

U.S. PATENT DOCUMENTS

| | | | |
|---|---|---|---|
| 3,825,815 | 7/1974 | Gyugyi et al. | |
| 4,651,265 | 3/1987 | Stacey et al. | |
| 4,941,079 | 7/1990 | Ooi | 363/132 |
| 5,355,025 | 10/1994 | Moran et al. | |
| 5,355,295 | 10/1994 | Brennen | 363/40 |
| 5,384,696 | 1/1995 | Moran et al. | 363/40 |

Primary Examiner—Peter S. Wong
Assistant Examiner—Pajnikant B. Patel
Attorney, Agent, or Firm—Walter G. Sutcliff

[57] ABSTRACT

A supplementary DC power source is coupled to the DC link circuit of an active power line conditioner (APLC) for sustaining uninterrupted AC power to a load during the time interval needed for AC power restoration or for an alternate or a back-up AC source to be brought on line to power the load upon temporary or continued failure of an AC power source. The supplementary DC source is comprised of a rectifier circuit across which is connected a storage capacitor. A boost converter and an auctioneer diode are coupled between the storage capacitor and the DC link circuit so that when the DC link drops in voltage in response to a sag in the AC source voltage upon loss of the AC voltage source, the necessary power is provided by the storage capacitor and boost converter. A pair of fast acting switches are also coupled between the AC source and the power bus feeding the inverters to isolate the AC source from the APLC and the load upon loss of the AC source. When the back-up AC source is required and comes up to voltage and is synchronized with the APLC, the fast acting switches are again closed to connect the back-up AC source to the APLC and the load.

23 Claims, 2 Drawing Sheets

UNINTERRUPTABLE CAPABILITY FOR AN ACTIVE POWER LINE CONDITIONER

BACKGROUND OF THE INVENTION

1. Field of the Invention

The present invention relates generally to an active power line conditioner (APLC) which is utilized to regulate the quality of electrical energy delivered to a load and more particularly to a series-parallel active power line conditioner which sustains uninterrupted power to a load for a predetermined time, typically 150 milliseconds, upon loss of the AC source voltage and its restoration or for a back-up source of AC voltage to be brought on line.

2. Description of Related Art

Electric supply networks are increasingly being exposed to the consequences of non-linear loads, such as data processing equipment, numerical controlled machines, variable speed motor drives, robotics, medical apparatus and communication equipment. Such loads draw non-linear pulse-like currents instead of sinusoidal currents which are drawn by linear loads, i.e. resistors, inductors and capacitors. These non-linear currents flow through the source impedance of the source of the electrical energy such as one or more AC generators, thus causing distortion of the AC line voltage.

To overcome AC line voltage distortion and apply a sinusoidal voltage to a non-linear load, there has been developed a class of power electronic devices, known as active power line conditioners (APLCs), which are connected between an AC power source and the load and comprise active power filters typically utilizing one or two switching inverters arranged in a series, parallel or series-parallel configuration. The inverters are controlled, generally by pulse-width modulation (PWM) techniques, to control the flow of current between a DC energy storage element and the AC supply lines to which they are connected. Such devices are shown and described in U.S. Pat. Nos. 4,651,265; 3,825,815, and 5,355,295, and are herein intended to be incorporated by reference.

In a conventional series-parallel APLC, two inverters are arranged to share a common DC link. In such an arrangement, the inverters cooperate to effect a transfer of real power between the source or load and the DC link so that the load continually sees an ideal sinusoidal current and voltage.

The series inverter in a series-parallel APLC is typically coupled to the AC supply source via a coupling transformer. The series inverter applies a voltage of selected magnitude and polarity to the secondary winding of the transformer to inject load voltage harmonics so as to zero current harmonics generated by the source, while the parallel inverter operates to inject source current harmonics in order to zero the load voltage harmonics. Thus, if the source voltage sags during part of the AC input waveform, the parallel inverter will sense the change and inject current into the line which will reduce the source current. The series inverter, on the other hand, senses the reduction in source current and then boosts the source voltage which returns the load voltage close to the desired fundamental voltage. The voltage boosts satisfies the parallel inverters, whereupon it reduces the current injection.

In an APLC, a capacitor or an inductor is typically used as an energy storage element to insure the presence of voltage on the DC link during variations in the demands placed on the inverters to deliver a clean sinusoidal AC voltage to the load. Theoretically, the capacitor or inductor should be able to provide sufficient energy to the inverters during a loss of the primary AC source voltage being furnished, for example, by an AC generator; however, in actuality, these storage elements have been found unable to furnish sufficient energy on their own during the time it takes for the generator voltage to be restored or for a second or back-up generator to come up to voltage and be synchronized with the load before being brought on line. More importantly, the loss of the AC source voltage from the generators results in a highly undesirable opening of one leg of the load circuit.

SUMMARY

It is the primary object of the present invention to enhance the capability of an active powerline conditioner such that it can provide uninterrupted, conditioned power to a load during a loss of AC input power for a predetermined time interval, e.g. 150 msec. This time is manifested during two periods of time. First, power is provided for a short specified time immediately after the primary AC source is lost upon the tripping of a circuit breaker and subsequently restored by reclosure of the breaker or before an alternate or back-up AC source is connected to the input bus. Second, power is provided for as long as is necessary to resynchronize the original AC source with the load or to, synchronize the alternate AC source with the load before it is brought on line.

The foregoing and other objects of the invention are achieved by the inclusion of a supplementary DC source coupled to the DC link circuit of an APLC which includes a series inverter and a parallel inverter coupled between an AC voltage source and a load. The supplementary DC source is comprised of a rectifier circuit across which is connected a storage capacitor. A boost converter and an auctioneer diode are coupled between the storage capacitor and the DC link circuit so that when the DC link drops in voltage in response to a sag in the AC source voltage upon loss of the AC voltage source, the DC link voltage is provided by the storage capacitor and boost converter. Also, a series connected fast acting switch isolates the AC source and its circuit braker from the APLC inverters and the load when there is a loss of AC voltage. With the loss of AC voltage from the source, the DC voltage on the link circuit is first maintained by the storage capacitor and boost circuit for a predetermined time interval, such as 150 msec, until the AC source is restored upon the tripping and reclosure of the circuit breaker or until an alternate AC source, e.g. a back-up generator, is brought on-line and reenergizes the AC input bus at an arbitrary voltage and phase angle. When the AC input bus is reenergized, it recharges the storage capacitor through a bridge rectifier and then continues to supply power through the rectifier and boost converter to the link circuit while the phase of the AC load voltage is brought into synchronization with the AC source. When the load is synchronized with the AC source voltage, the fast acting switch is again closed to reconnect AC source voltage to the APLC inverters and the load.

Further scope of applicability of the present invention will become apparent from the detailed description provided hereinafter. It should be understood, however, that the detailed description and specific examples, are provided by way of illustration only, since various changes and modifications within the spirit and scope of the invention will readily become apparent to those skilled in the art from this detailed description.

BRIEF DESCRIPTION OF THE DRAWINGS

The present invention will become more fully understood when considered together with the accompanying drawings wherein.

DETAILED DESCRIPTION OF THE INVENTION

Figure 1:
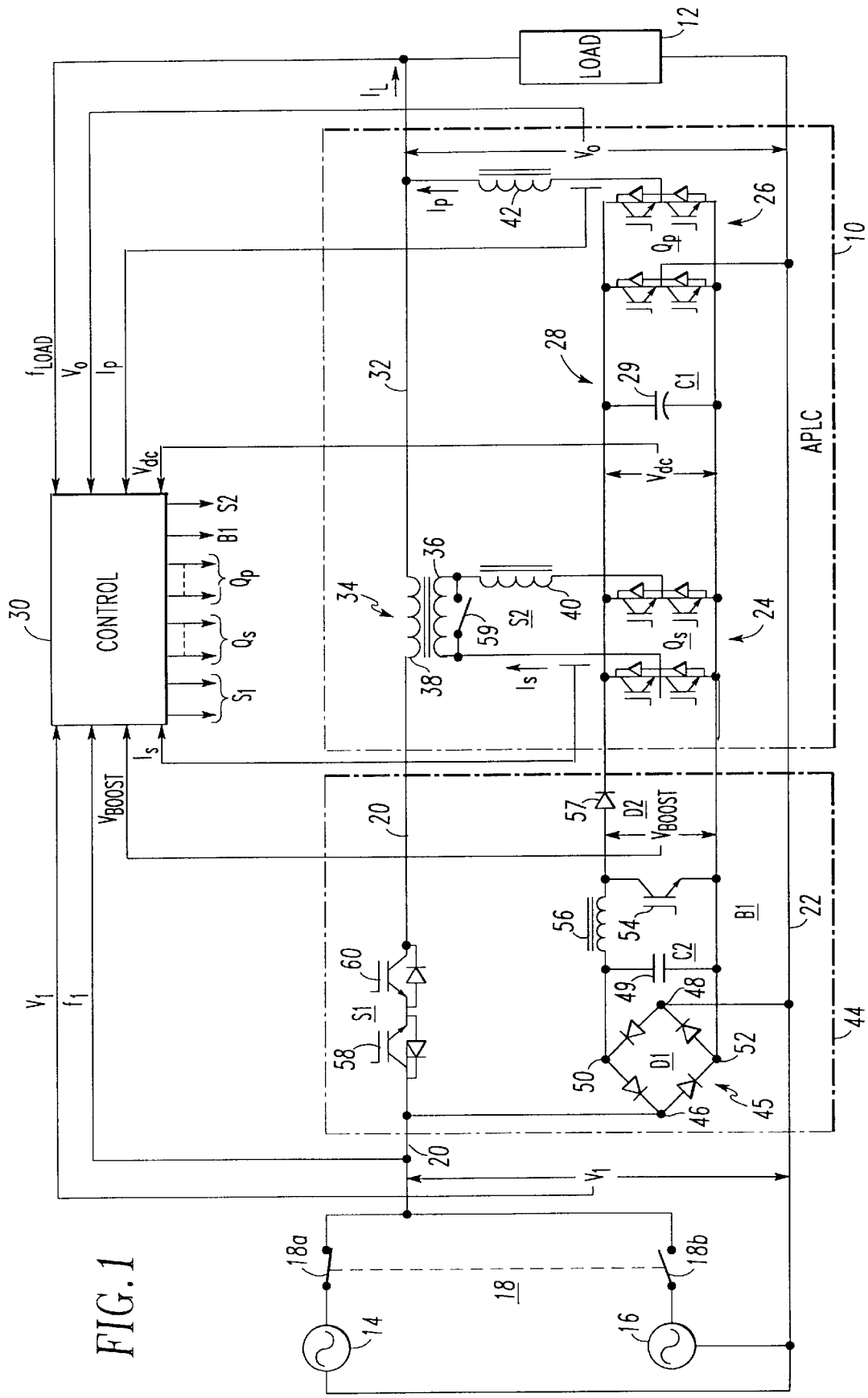
FIG. 1 is an electrical schematic diagram illustrative of the preferred embodiment of the invention.

Referring now to the drawings and more particularly to FIG. 1, reference numeral 10 denotes an active power line conditioner (APLC) of the series-parallel type of APLC used to supply an AC output voltage $V_0$ to a load 12 from either a primary AC source or a secondary/back-up AC source 16, both of which typically comprise AC generators. As shown, the primary and secondary AC sources 14 and 16 are individually connected into the system by means of a circuit breaker such as an automatic bus transfer (ABT) switch including two sets of contacts $18_a$ and $18_b$ which are selectively coupled to an input power bus 20 in front of a switch S1. While FIG. 1 discloses the preferred embodiment, it should be noted that the present invention is also intended to encompass a system which includes a single AC source 14 and switch having only one set of contacts $18_a$.

The APLC 10 comprises a conventional series-parallel device including a series inverter 24 and a parallel inverter 26 interconnected by a shared DC link circuit 28 including a capacitor 29 (C1) which is connected across the DC terminals of the inverters 24 and 26 and functions as a DC storage element.

The inverters 24 and 26 each include two pairs of switching devices, i.e. well known IGBT power switching devices, which are operated in a complementary manner by a control unit 30. The control unit 30 receives inputs from appropriate sensors within the APLC 10 which, among other things, provide information regarding the following parameters: The AC input voltage $V_1$, the AC output voltage $V_0$, the DC link voltage $V_{dc}$, the AC series inverter current $I_s$ and AC parallel inverter current $I_p$. In response to signals corresponding to these parameters, the control unit 30 generates appropriate gating signals $Q_s$ and $Q_p$ to the inverters 24 and 26 which causes the IGBTs to operate so as to deliver regulated and conditioned power to the load 12 at a fundamental frequency, typically 60 Hz.

The series inverter 24 provides AC regulation voltage of the AC line voltage on power bus 32 via a coupling transformer 34 consisting of a primary winding 36 and a secondary winding 38 as well as an inductor 40. As is well known, the series inverter 24 operates to apply an AC regulation (+/−) voltage to the AC input voltage $V_1$ in the proper phase and magnitude such that the AC output voltage $V_0$ is regulated. The parallel inverter 26 is connected across the load 12 to add or decrease line current on the power bus 32 also in a well known manner.

The preceding description comprises typical state of the art operation of an APLC. One can refer to the prior art, for example U.S. Pat. No. 5,355,295, for a more detailed treatment of this type of device, if need be.

The inventive concept of this invention is directed to a means for insuring the availability of AC output voltage $V_0$ across the load 12 during the time it takes to match voltages and synchronize the load 12 to the source following a loss of primary AC source 14 and after the primary AC source 14 or the backup AC source 16 reenergizes the APLC input bus 20 within a 150 msec time limit.

As is shown in FIG. 1, an additional circuit 44 is interposed between the APLC 10 and the AC sources 14 and 16.

The circuit 44 includes a full wave diode rectifier 45 (D1) connected to the input power bus 20 and a current return path 22 via terminals 46 and 48. A second storage capacitor 49 (C2) is coupled across the output terminals 50 and 52 of the bridge rectifier 51. Additionally, a boost converter module B1 including an IGBT 54 and an inductor 56 is connected to the capacitor 49. A diode 57 (D2) couples the DC link circuit 28 to the boost converter module B1. The circuit 44 also includes a fast acting AC power switch S1, shown consisting of two series connected solid state switches 58 and 60, which may be, for example, IGBTs, and the input power bus 20 connected to the input of the APLC 10.

A second switch shown by a single pole device 59 (S2) is connected across the secondary winding 38 of series inverter transformer 34. This switch comprises an electrical switch which is controlled by the control unit 30 by means of a control signal S2 generated thereby in a manner to be described.

Appropriate sensors are additionally provided to measure and provide signals corresponding to the frequency $f_1$ of the input voltage $V_0$ which appears on input power bus 20, a DC voltage $V_{boost}$ which appears across the solid state switch 54 of the boost converter module B1 and the frequency $f_{LOAD}$ of the voltage $V_0$. These signals are also applied to the control unit 30.

The control unit 30 in addition to generating gating signals $Q_s$ and $Q_p$ for the solid state switches in the series inverter and parallel converter, respectively, in accordance with well known PWM techniques, also now generates a pair of gating signals S1 for operating the two solid state switches 58 and 60 of the power switch S1. The control unit 30 also generates a signal pulse train $B_1$ for gating the solid state switch 54 of the boost converter B1 and a control signal S2 for operating the electrical switch 59 coupled across the primary winding 36 of the inverter transformer 34 in the APLC 10. Circuitry for generating these signals as well as a DISABLE signal for disabling the solid state power switching devices of the series inverter 24 when the switch S2 is closed is shown in FIG. 2.

When the circuit breaker 18 is set as shown in FIG. 1 to connect the generator 14 to the input power bus 20, capacitor 29 acts as the primary energy storage element to insure the presence of a DC voltage $V_{dc}$ on the DC link circuit 28 during variations in the demands placed on the series and parallel inverters 24 and 26. In most instances, capacitor 29 can provide sufficient energy to the inverters 24 and 26 during a reduction or "sagging" of the AC voltage $V_0$ being furnished by the primary AC source 14. However, in the event that the primary source 14 is temporarily lost or it becomes necessary to connect the alternate generator 16 in its place by setting the breaker 18 such that contacts 18a open while contacts 18b close, the primary storage element C1 cannot by itself furnish sufficient energy.

In such an event, S1 is opened and power is temporarily supplied to the load 12 by alternate means. The energy stored in capacitor 49 will supply this power for a short time interval, for example 150 msec, through the boost converter B1 until the alternate AC source 16 reenergizes input bus 20 at an arbitrary phase angle and voltage level. The reenergized bus 20 recharges C2 and supplies power to the load 12 through the boost converter B1, diode D2, and DC link circuit 28 of the APLC 10. This continues until the input bus voltage $V_1$ on the input bus 20 has been synchronized in frequency and phase and matched in voltage with the load voltage $V_0$ across the load 12, at which time normal operation is restored by reclosing S1 and opening S2. The DC voltage generated by the diode rectifier bridge B1 charges the storage capacitor 49 to a voltage that is set slightly below the normal APLC DC link voltage $V_{dc}$. This reverse biases diode D2 and prevents it from conducting. This is important during normal operations because the rectifier D1 is an undesirable nonlinear load which would draw current harmonics from the AC source 14. However, upon the loss of AC voltage from the primary source 14, and until the input bus 20 is reenergized, the boost converter B1 boosts the voltage so that diode D2 conducts and supplies current to the DC link 28.

Figure 2:
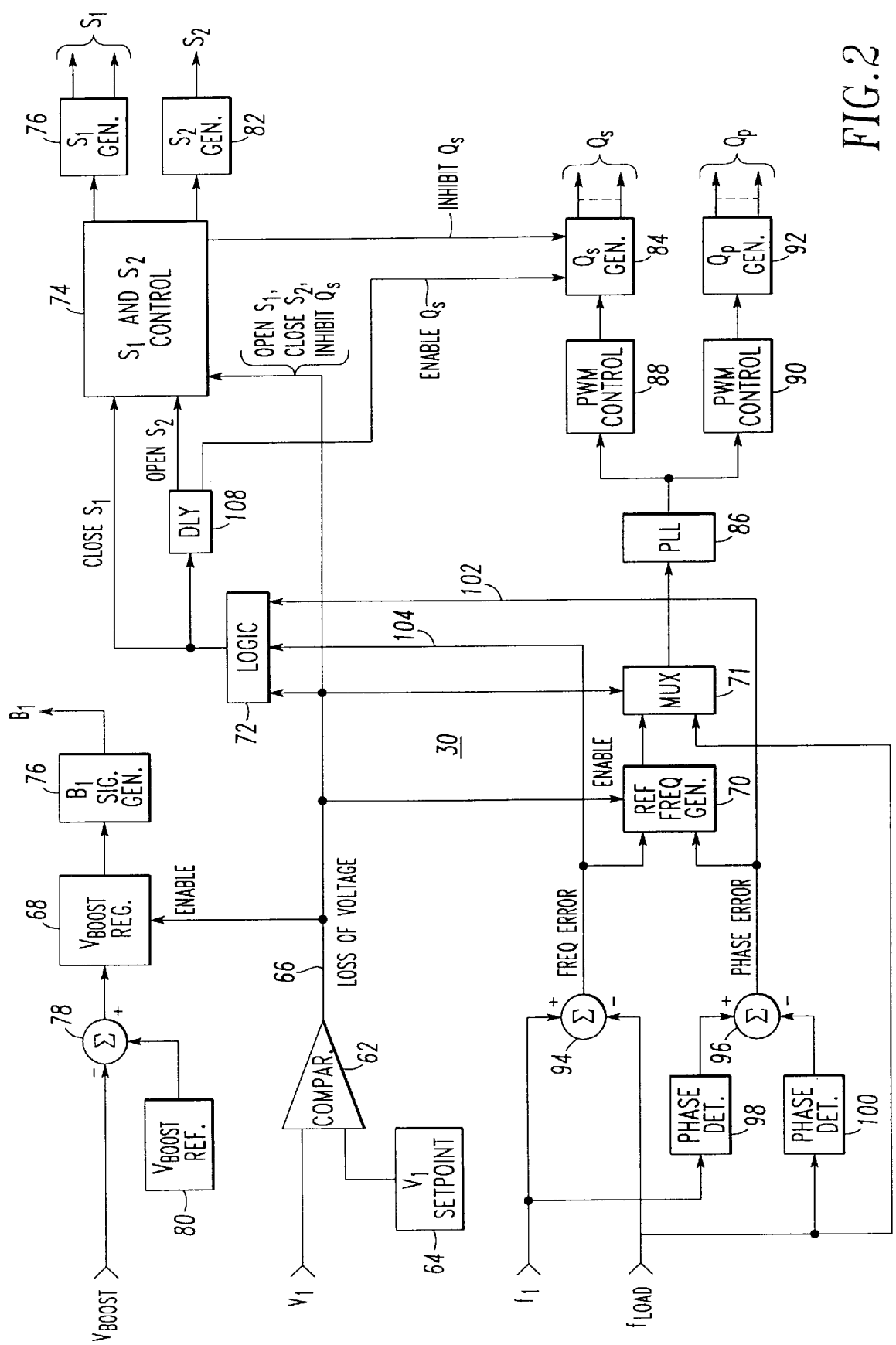
FIG. 2 is a partial electrical block diagram illustrative of the control circuitry for operating the embodiment shown in FIG. 1.

Looking now to FIG. 2, the loss of the source voltage on the input bus 20 is sensed and applied to the control unit 30 where it is fed to a comparator circuit 62. The comparator circuit 62 compares various parameters of the input voltage, such as voltage, frequency, or the rates of change of either, with an established setpoint(s) 64. When the parameter(s) cross the setpoint(s), the comparator 62 outputs a loss of voltage signal on signal lead 66. This signal is commonly fed to a $V_{boost}$ regulator 68, a reference frequency generator 70, a logic circuit 72, and a $S_1$ and $S_2$ control circuit 74. When a loss of voltage signal appears on circuit lead 66, the $V_{boost}$ regulator 68 and the reference frequency generator 70 are enabled and a signal is applied to the $S_1$ and $S_2$ control circuit 74 for stopping the generation of the S1 gating signals, thus causing solid state switches 58 and 60 to be non-conductive. This isolates the APLC 10 and load 12 from input power bus 20.

With the loss of AC voltage from the primary source 14, the APLC DC link voltage $V_{dc}$ is maintained by the secondary storage capacitor 49 which is now in parallel with capacitor C1 for a required ride-through time interval, e.g. 150 msec. for the reclosure of the breaker 18 should it trip for any reason or for the back-up source, i.e. generator 16 to be connected to the input bus 20 via closure of switch contacts $18_b$ of the breaker 18, to come up to voltage and be synchronized with the APLC load voltage $V_O$. During this time interval, the bridge rectifier D1 supports the load requirement along with the storage capacitor 49 so that there is no loss of current $I_L$ to the load 12. Concurrently with the loss of voltage being detected by the comparator 62, the pulse train $B_1$ of gate signals for solid state switch 54 of the boost converter $B_1$ is generated by a pulse signal generator 76 in response to the output of a $V_{boost}$ voltage regulator 68 which receives as an input an error signal coupled from a summing junction 78 which receives a reference value from a $V_{boost}$ reference circuit 80 and the $V_{boost}$ signal value detected across the IGBT switch element 54.

Also upon the detection of the loss of source voltage $V_1$, the control unit 30 deactivates the series inverter 24 by closing the switch S2 across the primary winding 36 of the transformer 34 as well as inhibits generation of the gating signals $Q_s$. This is accomplished through $S_1$ and $S_2$ control circuit 74 and S2 signal generator 82 which also applies an inhibit signal to the $Q_s$ gating signal generator 84.

The control unit 30 also acts to establish a fundamental reference frequency for a phase lock loop (PLL) 86 shown in FIG. 2 being connected to the output of the reference frequency generator 70. The PLL 86 controls two PWM control circuits 88 and 90 which controls the $Q_s$ generator 10 and a $Q_p$ gating signal generator 92, respectively. The fundamental reference frequency will be generated by the generator 70 until the back-up generator 16 comes up to full voltage and the switch S1 is reclosed.

The reclosure of the solid state switch S1 requires that the primary generator 14 first be resynchronized, if necessary, or that the back-up generator 16 be synchronized with the load 12. Synchronization is achieved by switching the input to the phase-locked loop (PLL) circuit 86 to the reference frequency signal from the frequency reference generator 70. The switch is performed by a multiplexer 71 when the loss-of-voltage signal on circuit lead 66 becomes active. Reference generator 70 insures that the APLC 10 has a frequency reference input even when the input AC bus 20 is deenergized. Also, it makes the frequency reference change slowly from the phase of primary AC source 14 to the phase of the back-up AC source 16. The reference frequency generator 70 receives frequency error and phase error inputs from summing points 94 and 96, respectively. As shown in FIG. 2, summing point 94 generates a frequency error signal from input signals corresponding to the frequency $f_1$ on the input bus 20, and the frequency $f_{load}$ of the AC signal applied to the load 12. Summing point 96 generates a phase error signal from a pair of detectors 98 and 100, respectively also receiving inputs corresponding to $f_1$ and $f_{load}$.

The phase error signal from the summing junction 96 is applied to the logic circuit 72 along with the frequency error signal from summing junction 94 by circuit leads 102 and 104. When the frequency error signal and the phase error signal are substantially zero, indicating that both signals $V_1$ and $V_O$ are synchronized both in frequency and phase, the logic circuit 72 generates a command signal for the control circuit 74 to close switch S1, open switch S2 and enable the generation of the gating signals $Q_s$.

As shown in FIG. 2, a time delay circuit is placed between the logic circuit 72 and the control circuit 74, as well as the $Q_s$ generator 84 in order for enhancing operation; however, when desirable, such an element may be deleted.

Accordingly, restoration of AC voltage to the APLC 10 and load 12 via the power bus 20 is achieved upon reclosure of the switch S1. When this occurs, the normal DC link voltage $V_{dc}$ generated by the APLC 10 is reestablished. Since its normal value is slightly higher than that drive from the boost converter B1, the diode D2 will block current from the DC link circuit 28 from being fed back to the boost converter B1. The APLC 10 will thereafter continue functioning as normal, with all power now being supplied by the back-up generator 16.

Thus the circuitry 44 in conjunction with the control unit 30 will detect the loss of the voltage source, e.g. AC generator 14, measure the frequency $f_1$ appearing on the input bus 20, the frequency $f_{load}$ of the voltage $V_O$ across the load 12 control the switch S1 between the source and the load, turn off the series inverter along with closing switch S2 to activate the boost converter B1 and generate a reference frequency for synchronizing the APLC 10 and load 12 with the back-up generator 16 before it is brought on line or resynchronize the primary generator 14, if need be, with the load 12 where the breaker 18 trips and recloses within the 150 msec. time limit.

Having thus described what is at present considered to be the preferred embodiment of the invention, it should be noted that the same has been made by way of illustration and not limitation. Accordingly, all modifications, alterations and changes coming within the spirit and scope of the invention are herein meant to be included.

We claim:

1. A circuit for sustaining uninterrupted AC power flow to an electrical load through an active power line conditioner for a predetermined transient time interval between the loss of an AC source applied to a power bus coupled to the load via a circuit breaker and subsequent restoration of AC power to the power bus, and wherein the active power line conditioner includes a series inverter, a parallel inverter, and a DC link circuit having a predetermined DC link voltage and including a DC storage element coupled between said series inverter and said parallel inverter and being operable so that the load receives distortion free sinusoidal current and voltage from an AC power source, said circuit comprising:

switch means connected in series with said power bus and the active power line conditioner;

circuit means providing a supplementary source of DC voltage for supplying a DC voltage to the DC link circuit during said transient time interval and having a voltage value below said predetermined DC link voltage during normal operation;

diode circuit means interconnected between said DC link circuit and said circuit means providing a supplementary source of DC voltage and being poled so as to be back biased and therefore non-conductive during normal operation but becoming conductive during said transient time interval to supply a DC voltage to said link circuit from said supplementary source, and control circuit means being operable during said transient time interval for operating said switch means to disconnect said power bus from said switch means thereby isolating the active power line conditioner and load from said AC source, for synchronizing the AC source voltage in both frequency and phase to the voltage appearing across the load, and for operating said switch means at the end of said transient time interval to connect said AC source to said active power line conditioner and load when said AC source is synchronized with the voltage across the load.

2. A circuit according to claim 1 wherein said control circuit means additionally includes means for deenergizing the series inverter of the active power line conditioner during said transient time interval.

3. A circuit according to claim 2 wherein said series inverter includes a transformer including primary and secondary windings, wherein the secondary winding thereof is coupled to said power bus and additionally including electrically operated switch means coupled across the primary winding and being operated by said control circuit means so as to be closed during said transient time interval and thereafter being reopened when said switch means connects AC source voltage to said power bus.

4. A circuit according to claim 1 wherein said supplementary source of DC voltage includes:

rectifier circuit means coupled to said power bus for generating a DC voltage from AC source voltage appearing on said power bus;

capacitance means coupled to said rectifier circuit means and being charged by said DC voltage generated by said rectifier circuit means to a voltage less than the predetermined DC link voltage;

boost converter means connected to said capacitance means;

said capacitance means and said boost converter means being operable to supply DC voltage to the DC link circuit during said transient time interval.

5. A circuit according to claim 4 and wherein said control means is additionally operable to control said boost converter means for supplying a DC voltage to the DC link circuit during said transient time interval.

6. A circuit according to claim 5 and additionally including circuit means for detecting and generating a signal corresponding to the voltage across said boost converter means, said signal being coupled to said control circuit means and wherein said control circuit means energizes said boost converter means during said transient time interval.

7. A circuit according to claim 5 wherein said boost converter means includes an inductor and at least one semiconductor power switching device.

8. A circuit according to claim 4 wherein said control circuit means includes means for synchronizing the frequency and phase of the AC source voltage to the frequency and phase of the voltage appearing across the load.

9. A circuit according to claim 4 wherein said rectifier circuit means comprises a diode bridge rectifier circuit.

10. A circuit according to claim 1 wherein said DC storage element of said DC link circuit comprises capacitance means for storing DC energy.

11. A control circuit according to claim 1 wherein said switch means comprises solid state disconnect switch means operable by said control circuit means.

12. A circuit for sustaining uninterrupted AC power flow to an electrical load through an active power line conditioner for a predetermined transient time interval between the loss of an AC source applied to a power bus coupled to the load and restoration of AC power to the power bus from a first AC source or a second AC source, and wherein the active power line conditioner includes a series inverter, a parallel inverter, and a DC link circuit including a DC storage element coupled between said series inverter and said parallel inverter and having a predetermined DC link voltage thereacross under normal operation and being operable so that the load receives distortion free sinusoidal current and voltage from said first AC power source or said second AC power source, said circuit comprising:

switch means connected in series with said power bus;

rectifier circuit means coupled to said power bus for generation a DC voltage from an AC source voltage appearing on said power bus;

capacitance means coupled to said rectifier circuit means and being charged by said DC voltage generated thereby to a voltage less than said predetermined DC link voltage;

a boost converter powered by said DC voltage from said capacitance means;

said capacitance means and said boost converter being operable to supply DC voltage to the DC link circuit during said transient time interval;

diode means coupled in series between said boost converter and the DC link circuit and being poled so as to be non-conductive when said predetermined DC link voltage is present across said DC link circuit but becoming conductive when the voltage on the DC link circuit falls below said predetermined link voltage so as to supply DC voltage to the DC link circuit from said capacitance means and boost converter during said transient time interval; and control circuit means being operable during said transient time interval for operating said switch means to disconnect said power bus from said first or second AC source and thereby isolate the active power line conditioner and load from said AC source, for energizing said boost converter to supply a boost voltage to the DC link circuit upon the loss of said first AC source, for synchronizing the AC source voltage of said first or second AC source with the active power line conditioner voltage, and for operating said switch means at the end of said transient time interval to reconnect said first AC source to said power bus or to connect said second AC source to said power bus.

13. A circuit according to claim 12 and additionally including circuit means for detecting and generating a first signal corresponding to a loss of AC source voltage on said power bus, and a second signal corresponding to the frequency of the AC source voltage on said power bus, said signals being further coupled to said control circuit means.

14. A circuit according to claim 13 wherein said control circuit means additionally includes means for deenergizing the series inverter during said transient time interval in response to said first signal.

15. A circuit according to claim 13 wherein said series inverter includes a transformer including primary and secondary windings, wherein the secondary winding thereof is coupled to said power bus and additionally including electrically operated switch means coupled across the primary winding and being operated by said first signal so as to be closed during said transient time interval and thereafter being reopened when said switch means connects said first or second AC source to said power bus.

16. A circuit according to claim 12 and additionally including circuit means for detecting and generating a third signal corresponding to the voltage across said boost converter, said third signal being coupled to said control circuit means and wherein said control circuit means energizes said boost converter during said transient time interval in response to said third signal.

17. A circuit according to claim 12 wherein said boost converter includes at least one semiconductor power switching device.

18. A circuit for sustaining uninterrupted AC power flow to an electrical load for a predetermined transient time interval between the loss of a primary AC source applied to a power bus coupled to the load and restoration of AC power to the power bus from said primary AC source or an alternate AC source, comprising:

an active power line conditioner including a series inverter, a parallel inverter, and a DC link circuit having a DC link voltage thereacross of a predetermined value and including a DC storage element coupled between said series inverter and said parallel inverter;

at least one bus disconnect switch connected in series with said power bus between said primary AC source or said alternate AC source and the series inverter of the active power line conditioner;

rectifier circuit means coupled to said power bus between said primary or alternate AC source and said at least one bus disconnect switch for generating a DC voltage from an AC source voltage appearing on said power bus;

storage capacitance means coupled to said rectifier circuit means and being charged by said rectifier circuit means to a voltage less than the predetermined value of the link voltage;

a boost converter including series inductance means coupled across said capacitance means for supplying DC voltage to said DC link circuit during said transient time interval;

diode circuit means connected in series between said boost converter and the DC link circuit and being poled so as to be non-conductive when the DC link voltage is of said predetermined value and becoming conductive when the DC link voltage falls below said predetermined value whereupon said boost converter supplies DC voltage to the DC link circuit; and control circuit means being operable during said transient time interval for operating said at least one bus disconnect switch to disconnect said power bus from AC source voltage, for energizing said boost converter so as to supply a boost voltage to the DC link circuit upon the loss of AC source voltage on said power bus, for synchronizing the primary AC source or the alternate AC source with the AC voltage across the active power line conditioner and load, and for operating said at least one bus disconnect switch at the end of said transient time interval to reconnect said primary AC source to said power bus or to connect said alternate AC source to said power bus.

19. A circuit according to claim 18 wherein said control circuit means additionally includes means for deenergizing the series inverter during said transient time interval.

20. A circuit according to claim 18 wherein said series inverter includes a transformer including primary and secondary windings, wherein the secondary winding thereof is coupled to said power bus and additionally including electrically operated switch means coupled across the primary winding and being operated by said control circuit means so as to be closed during said transient time interval and thereafter being reopened when said at least one bus disconnect switch connects said primary AC source or said alternate AC source to said power bus.

21. A method for sustaining uninterrupted AC power flow to an electrical load through an active power line conditioner for a transient time interval between the loss of an AC source voltage supplied to a power bus connected to the active power line conditioner and the load and the restoration of the AC source voltage to the power bus from a first AC source or a second AC source, and wherein the active power line conditioner includes a series inverter, a parallel inverter, and a DC link circuit, comprising the steps of:

detecting the loss of the AC source voltage on the power bus;

interrupting connection of the power bus to the active power line conditioner and load upon loss of the AC source voltage;

maintaining the DC voltage on the DC link circuit during said transient time interval by a supplementary DC source;

detecting the frequency of the AC source voltage;

detecting the frequency of the AC voltage across the load;

synchronizing the AC source voltage from the first or second AC source to the AC voltage on the active power line conditioner and across the load; and reconnecting the power bus to the active power line conditioner and the load so as to apply AC source voltage from the first or second AC source to the active power line conditioner and the load.

22. The method of claim 21 wherein said first AC source normally supplies AC source voltage and additionally including the step of supplying AC source voltage to the power bus from said second AC source upon the loss of AC source voltage from the first AC source.

23. The method of claim 21 and additionally including the step of deenergizing the series inverter of the active power line conditioner during the transient time interval.

* * * * *